US007800659B2

United States Patent
Hanada

(10) Patent No.: US 7,800,659 B2
(45) Date of Patent: Sep. 21, 2010

(54) CAMERA AND FILE MANAGEMENT METHOD USED THEREIN

(75) Inventor: Naoki Hanada, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 451 days.

(21) Appl. No.: 11/976,970

(22) Filed: Oct. 30, 2007

(65) Prior Publication Data
US 2008/0106617 A1 May 8, 2008

(30) Foreign Application Priority Data
Nov. 2, 2006 (JP) ............................. 2006-299438
Sep. 21, 2007 (JP) ............................. 2007-245030

(51) Int. Cl.
*H04N 5/76* (2006.01)
(52) U.S. Cl. ................................................. 348/231.99
(58) Field of Classification Search ............. 348/231.99
See application file for complete search history.

(56) References Cited
U.S. PATENT DOCUMENTS
7,523,869 B2 * 4/2009 Helkio et al. .......... 235/472.01

2004/0201737 A1 * 10/2004 Baron et al. .............. 348/231.2
2007/0015550 A1 * 1/2007 Kayanuma ............... 455/575.1

FOREIGN PATENT DOCUMENTS
JP 2002-252825 9/2002

* cited by examiner

*Primary Examiner*—James M Hannett
(74) *Attorney, Agent, or Firm*—Louis Woo

(57) ABSTRACT

A recording medium has clusters assigned first cluster information pieces respectively. The clusters store a file or files of image data. When a received signal is a copying command indicative of a requested file, image data in the requested file is read from one or more clusters and is sent. Detection is made about a first cluster information piece or pieces assigned to the one or more clusters from which the image data is read. The detected first cluster information piece or pieces are labeled as a second cluster information piece or pieces. Identification is made about a first cluster information piece or pieces assigned to one or more clusters loaded with image data in the requested file. When the identified first cluster information piece or pieces are equal to the second cluster information piece or pieces, the requested file is recognized as a file which has been copied.

13 Claims, 7 Drawing Sheets

FIG. 2

FAT

| CLUSTER ID NUMBER | NEXT CLUSTER ID NUMBER |
|---|---|
| 0 | 1 |
| 1 | END |
| 2 | 3 |
| 3 | 6 |
| 4 | END |
| 5 | |
| 6 | END |
| 7 | |
| 8 | |
| ⋮ | |

FIG. 3

DIRECTORY

| FILE NAME | FIRST CLUSTER ID NUMBER |
|---|---|
| A | 0 |
| B | 2 |
| C | 4 |
| | |
| | |
| | |

FIG. 4

DATA AREA

| CLUSTER ID NUMBER | CAPTURED-IMAGE DATA |
|---|---|
| 0 | a1 |
| 1 | a2 |
| 2 | b1 |
| 3 | b2 |
| 4 | c |
| 5 | |
| 6 | b3 |
| 7 | |
| 8 | |
| ⋮ | |

CAMERA AND FILE MANAGEMENT METHOD USED THEREIN

BACKGROUND OF THE INVENTION

1. Field of the Invention

This invention relates to a camera having an internal recording medium for storing information representative of captured images (or video and audio), and an interface for transmitting the information from the internal recording medium to an external recording device. This invention further relates to a method of managing files of captured images (or video and audio) which is designed for use in such a camera.

2. Description of the Related Art

General cameras include video cameras, camcorders, and electronic still cameras. There is a known camera with a built-in recording medium which has a function of capturing images and sounds, a function of generating data representative of the captured images and sounds, a function of storing the generated data into the built-in recording medium, and a function of reproducing or reading the data from the built-in recording medium. Examples of the built-in recording medium are optical discs, semiconductor memories, and hard discs. The optical discs include DVDs (Digital Versatile Discs) having a diameter of 8 cm. The semiconductor memories include card-like memories and stick-like memories.

The above known camera has an interface for moving the data from the built-in recording medium to an external recording device such as a personal computer (PC). Generally, the movement of the data from the built-in recording medium to the external recording device is performed in order to prevent the built-in recording medium from overflowing. The interface is of, for example, the USB (Universal Serial Bus) type, the IEEE1394 type, or the wireless type conforming to the IEEE802.11a/b/g standards. The external recording device has a data backup area provided in a hard disc or a DVD having a diameter of 12 cm. The data coming from the camera is stored into the data backup area in the external recording device.

The data in the built-in recording medium within the camera can be copied onto the data backup area in the external recording device through the interface. Once the data has been copied, the data in the built-in recording medium is unnecessary for the user. On the other hand, as the data is moved from the built-in recording medium within the camera to the data backup area in the external recording device, the built-in recording medium is more unoccupied.

Japanese patent application publication number 2002-252825 discloses an electronic still camera and a data storage device which can be connected on a wireless communication basis or a wired communication basis using an IEEE1394 cable, a USB cable, or a network cable. The electronic still camera captures an image, and generates main data representative of the captured image and sub data representative of a thumbnail of the captured image. The electronic still camera has an internal memory. For every captured image, the electronic still camera combines main image data, thumbnail image data, and an ID (a file ID) into an image data file stored in the internal memory. The electronic still camera transmits a copy of the image data file from the internal memory to the data storage device. The above-mentioned image capture, file generation, and file copy transmission are sequentially performed after a power supply switch of the electronic still camera is changed to its ON position.

The data storage device in Japanese application 2002-252825 contains a memory unit. The transmitted copy of the image data file is recorded in the memory unit within the data storage device. After the copy of the image data file has been recorded in the memory unit, the data storage device generates a reception completion signal. The data storage device transmits the reception completion signal to the electronic still camera. In response to the reception completion signal, the electronic still camera deletes the main image data from the image data file in the internal memory.

In Japanese application 2002-252825, the electronic still camera generates a deletion command, a protection command, or a protection cancel command for selected one of image data files in the internal memory according to operator's request. The generated command contains the ID for the selected image data file. The electronic still camera transmits the generated command to the data storage device. When the transmitted command is a deletion command, the data storage device deletes the image data file, which has the same ID as that in the transmitted command, from the memory unit. Then, the data storage device generates a deletion completion signal. The data storage device transmits the deletion completion signal to the electronic still camera. In response to the deletion completion signal, the electronic still camera deletes the image data file, which corresponds to the deletion command, from the internal memory. When the transmitted command is a protection command, the data storage device inhibits the deletion of the image data file, which has the same ID as that in the transmitted command, from the memory unit. Then, the data storage device generates a protection completion signal. The data storage device transmits the protection completion signal to the electronic still camera. In response to the protection completion signal, the electronic still camera takes a step toward protecting the image data file, which corresponds to the protection command, in the internal memory. When the transmitted command is a protection cancel command, the data storage device cancel the inhibition on the deletion of the image data file, which has the same ID as that in the transmitted command, from the memory unit. Then, the data storage device generates a protection cancel completion signal. The data storage device transmits the protection cancel completion signal to the electronic still camera. In response to the protection cancel completion signal, the electronic still camera takes a step toward canceling the protection for the image data file, which corresponds to the protection cancel command, in the internal memory.

In Japanese application 2002-252825, the electronic still camera is a host (an operating or controlling side) while the data storage device is its peripheral (an operated or controlled side).

Some peripheral devices with respect to personal computers handle captured-image/sound data. In the case where a personal computer and its peripheral device are connected by a USB cable, captured-image/sound data can be transmitted from the peripheral device to the personal computer according to an application program installed on the personal computer. In more detail, when the personal computer is operated under a driver program conforming to the USB mass storage class, the personal computer recognizes the peripheral device connected thereto as one drive device. In this case, the captured-image/sound data can be transmitted from the peripheral device to the personal computer or can be deleted from the peripheral device in accordance with drag-and-drop performed on the personal computer by the user. A video camera can be an example of such a peripheral device. In the foregoing case, the personal computer is a host (an operating or controlling side) while the peripheral device or the video camera is a drive device (an operated or controlled side) connected thereto. Accordingly, the video camera can not freely control the captured-image/sound data. Thus, it is difficult for the video camera to surely detect the completion of copying the captured-image/sound data from its built-in recording medium onto the personal computer, and then delete the captured-image/sound data from the built-in recording medium.

SUMMARY OF THE INVENTION

It is a first object of this invention to provide a camera able to detect information about files of captured-image/sound data which have been copied onto a data backup area in a personal computer, and then easily select these files and delete them from an internal recording medium.

It is a second object of this invention to provide a method of managing files of captured-image/sound data which is designed for use in such a camera.

A first aspect of this invention provides a camera comprising first means for repetitively capturing an image of a subject and generating captured-image data representing the captured image of the subject; a first recording medium; second means for recording the captured-image data generated by the first means on one or more of clusters of unit recording areas in the first recording medium, wherein first cluster information pieces are assigned to the clusters respectively; third means for managing said one or more of the clusters as one data file including the captured-image data recorded on said one or more of the clusters by the second means; fourth means for receiving a control signal from an external recording device; fifth means for deciding whether or not the control signal received by the fourth means is a copying command indicative of a requested data file; sixth means for reading captured-image data in the requested data file from one or more clusters in the first recording medium and sending the read captured-image data toward the external recording device when the fifth means decides that the control signal is the copying command; a second recording medium; seventh means for detecting a first cluster information piece or pieces assigned to said one or more clusters from which the sixth means reads the captured-image data; eighth means for recording the first cluster information piece or pieces detected by the seventh means on the second recording medium as a second cluster information piece or pieces; ninth means for detecting a first cluster information piece or pieces assigned to one or more clusters loaded with captured-image data in the requested data file; tenth means for deciding whether or not the first cluster information piece or pieces detected by the ninth means are the same as the second cluster information piece or pieces; eleventh means for recognizing the requested data file as a data file which has been copied only when the tenth means decides that the first cluster information piece or pieces detected by the ninth means are the same as the second cluster information piece or pieces; and twelfth means for discriminating a data file which has been copied and a data file which has not been copied yet from each other in response to the recognizing by the eleventh means.

A second aspect of this invention is based on the first aspect thereof, and provides a camera wherein the twelfth means comprises means for generating a folder in the second recording medium, and means for moving a data file, recognized by the eleventh means as a data file which has been copied, from the first recording medium to the generated folder.

A third aspect of this invention is based on the first aspect thereof, and provides a camera wherein the twelfth means comprises means for generating a list file in the second recording medium, and means for recording information about a data file, recognized by the eleventh means as a data file which has been copied, into the generated list file.

A fourth aspect of this invention is based on the first aspect thereof, and provides a camera wherein the twelfth means comprises a display, means for generating signals representing thumbnail images corresponding to respective data files, and means for indicating the thumbnails represented by the said generated signals on the display in a manner such that a data file which has been copied and a data file which has not been copied yet can be discriminated from each other.

A fifth aspect of this invention is based on the first aspect thereof, and provides a camera wherein the first recording medium and the second recording medium comprise a common recording medium including a hard disc.

A sixth aspect of this invention is based on the first aspect thereof, and provides a camera wherein the first recording medium and the second recording medium are different from each other.

A seventh aspect of this invention is based on the sixth aspect thereof, and provides a camera wherein the first recording medium includes a hard disc.

An eighth aspect of this invention provides a file management method used for a camera. The method comprises the steps of repetitively capturing an image of a subject and generating a captured-image data representing the captured image of the subject; recording the captured-image data generated by the capturing step on one or more of clusters of unit recording areas in a first recording medium, wherein first cluster information pieces are assigned to the clusters respectively; managing said one or more of the clusters as one data file including the captured-image data recorded on said one or more of the clusters by the recording step; receiving a control signal from an external recording device; deciding whether or not the control signal received by the receiving step is a copying command indicative of a requested data file; reading captured-image data in the requested data file from one or more clusters in the first recording medium and sending the read captured-image data toward the external recording device when the deciding step decides that the control signal is the copying command; detecting a first cluster information piece or pieces assigned to said one or more clusters from which the reading step reads the captured-image data; recording the first cluster information piece or pieces detected by the detecting step on a second recording medium as a second cluster information piece or pieces; identifying a first cluster information piece or pieces assigned to one or more clusters loaded with captured-image data in the requested data file; determining whether or not the first cluster information piece or pieces identified by the identifying step are the same as the second cluster information piece or pieces; recognizing the requested data file as a data file which has been copied only when the determining step determines that the first cluster information piece or pieces identified by the identifying step are the same as the second cluster information piece or pieces; and discriminating a data file which has been copied and a data file which has not been copied yet from each other in response to the recognizing by the recognizing step.

A ninth aspect of this invention is based on the eighth aspect thereof, and provides a file management method wherein the discriminating step comprises generating a folder in the second recording medium, and moving a data file, recognized by the recognizing step as a data file which has been copied, from the first recording medium to the generated folder.

A tenth aspect of this invention is based on the eighth aspect thereof, and provides a file management method wherein the discriminating step comprises generating a list file in the second recording medium, and recording information about a data file, recognized by the recognizing step as a data file which has been copied, into the generated list file.

An eleventh aspect of this invention is based on the eighth aspect thereof, and provides a file management method wherein the discriminating step comprises generating signals representative of thumbnail images corresponding to respective data files, and displaying the thumbnails represented by the said generated signals in a manner such that a data file which has been copied and a data file which has not been copied yet can be discriminated from each other.

A twelfth aspect of this invention is based on the eighth aspect thereof, and provides a file management method wherein the first recording medium and the second recording medium comprise a common recording medium.

A thirteenth aspect of this invention is based on the eighth aspect thereof, and provides a file management method wherein the first recording medium and the second recording medium are different from each other.

A fourteenth aspect of this invention provides a camera comprising a recording medium storing data files of captured-image data; first means for reading, from the recording medium, a data file requested by an external recording device for a copying purpose; second means for detecting a condition of the reading of the requested data file by the first means; third means for deciding whether or not copying the requested data file from the recording medium onto the external recording device is completed in response to the condition detected by the second means; and fourth means for discriminating, among the data files, a data file which has been copied and a data file which has not been copied yet in response to a result of the deciding by the third means.

This invention has advantages as follows. Even in the case where the camera is a drive device as seen from the external recording device, the camera can detect captured-image data which has been copied onto the external recording device. Therefore, it is possible to easily select, from all captured-image data recorded on the first recording medium, given data which has been copied, and then delete the selected data from the first recording medium. Specifically, when captured-image data is copied from the first recording medium within the camera onto the second recording device, the camera detects information about the copied captured-image data and stores the detected information into the second recording medium. Thus, the camera can easily discriminate a data file which has been copied and a data file which has not been copied yet from each other.

BRIEF DESCRIPTION OF THE DRAWINGS

FIG. 2 is a diagram of an example of the contents of a FAT provided in a recording medium within the video camera of FIG. 1.

FIG. 3 is a diagram of an example of the contents of a directory provided in the recording medium within the video camera of FIG. 1.

FIG. 4 is a diagram of an example of the conditions of a data area in the recording medium within the video camera of FIG. 1.

DETAILED DESCRIPTION OF THE INVENTION

Figure 1:
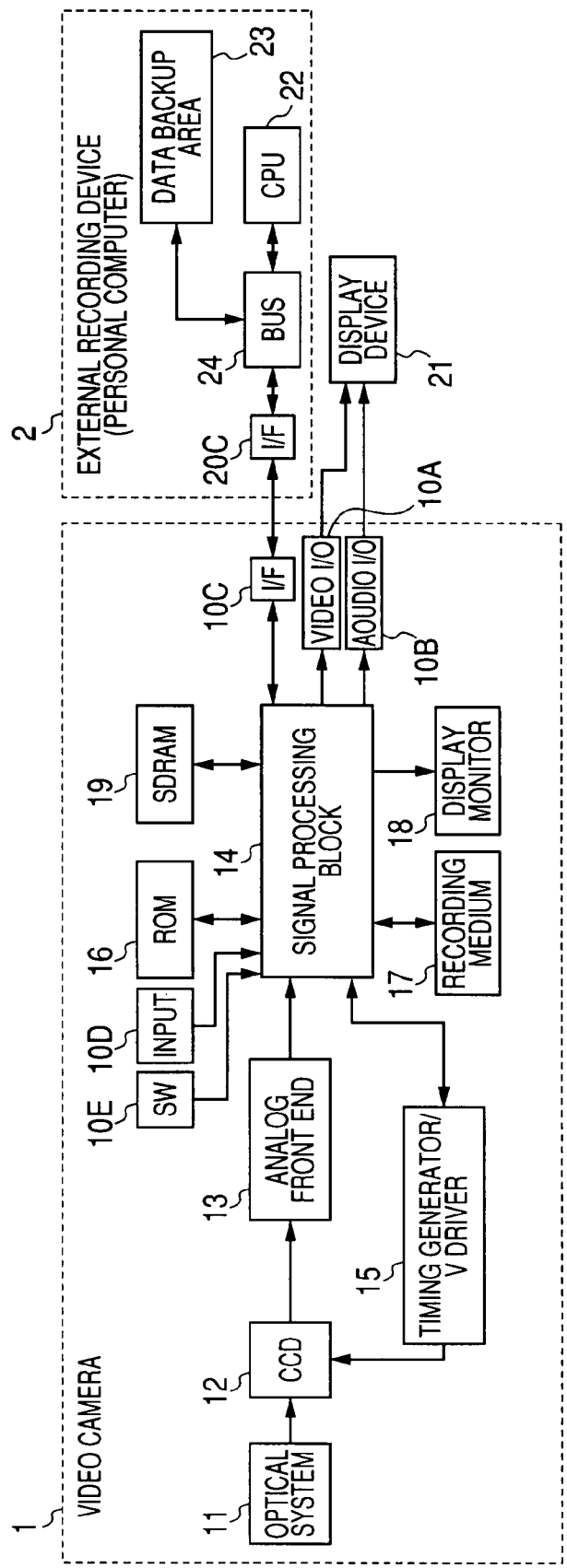
FIG. 1 is a block diagram of a video camera and an external recording device according to an embodiment of this invention.

With reference to FIG. 1, a video camera 1 includes an optical system 11, a CCD (an image sensor or an imaging element array of a CCD type) 12, an analog front end 13, a signal processing block 14, a timing generator/V driver 15, a ROM 16, a recording medium 17, a display monitor 18, and an SDRAM (Synchronous Dynamic RAM) 19. It should be noted that the video camera 1 may be replaced by an electronic still camera or another camera. Generally, the recording medium 17 means a combination of a recording medium and a drive therefor. Data can be written into and read from the recording medium when the drive is controlled accordingly.

The video camera 1 operates in a mode selected from different modes including a captured-image/sound-data recording mode.

During the captured-image/sound-data recording mode of operation of the video camera 1, the optical system 11 projects incident light from a subject onto the CCD 12. The CCD 12 converts the projected light into an electric signal representing an image of the subject or a sequence of images of the subject. The CCD 12 feeds the electric image signal to the analog front end 13. The timing generator/V driver 15 serves as a vertical driver for the CCD 12. The signal processing block 14 outputs a sync signal to the timing generator/V driver 15. The timing generator/V driver 15 generates a timing signal in response to the sync signal. The timing generator/V driver 15 outputs a drive signal to the CCD 12 in response to the generated timing signal. Operation of the CCD 12 is controlled by the drive signal.

Preferably, the video camera 1 is equipped with a microphone (not shown) for picking up sounds. The microphone converts the sounds into an electric audio signal. The microphone feeds the electric audio signal to the analog front end 13.

The analog front end 13 removes noise from the electric image signal, and changes the resultant signal into a corresponding digital image signal through analog-to-digital conversion. The analog front end 13 feeds the digital image signal to the signal processing block 14. The analog front end 13 removes noise from the electric audio signal, and changes the resultant signal into a corresponding digital audio signal through analog-to-digital conversion. The analog front end 13 feeds the digital audio signal to the signal processing block 14.

The signal processing block 14 includes a microcomputer for signal processing and control of other devices connected thereto. The signal processing block 14 operates in accordance with a control program stored in the ROM 16. The control program is designed to enable the signal processing block 14 to implement actions indicated hereafter. The signal processing block 14 subjects the digital image signal and the digital audio signal to prescribed processing. Specifically, when the digital image signal represents moving pictures, the signal processing block 14 subjects the digital image signal to MPEG encoding and compression and thereby generates captured-image data. When the digital image signal represents a still picture, the signal processing block 14 subjects the digital image signal to JPEG encoding and compression and thereby generates captured-image data. The signal processing block 14 subjects the digital audio signal to AC3 encoding and compression and thereby generates captured-sound data. The signal processing block 14 combines the captured-image data and the captured-sound data into captured-image/sound data. The signal processing block 14 writes the captured-image/sound data into the recording medium 17.

Preferably, the recording medium 17 is contained in the body of the video camera 1. It should be noted that the recording medium 17 (the combination of the recording medium and the drive therefor) may be outside the body of the video camera 1. In this case, it is preferable that the recording medium 17 (the combination of the recording medium and the drive therefor) is detachably connected to the video camera 1 via a connector. The signal processing block 14 controls the drive to implement writing the captured-image/sound data into the recording medium.

Captured-image/sound data is managed by the signal processing block 14 on a file-by-file basis. Preferably, the captured-image/sound data is separated into portions assigned to data files respectively. The captured-image/sound data may be assigned to one data file. Thus, one or more data files of captured-image/sound data are present. One or more data files are recorded on the recording medium 17 by the signal processing block 14.

Preferably, the recording medium 17 includes a hard disc, a semiconductor memory, or a DVD. When the recording medium 17 includes a hard disc or a DVD, the signal processing block 14 accesses the hard disc or the DVD through the drive therefor. It should be noted that the recording medium 17 generally means a combination of a recording medium and a drive therefor. Preferably, the recording medium 17 and the body of the video camera 1 are designed so that the recording medium 17 can not be easily removed from the body of the video camera 1.

The signal processing block 14 can read data files from the recording medium 17. The signal processing block 14 can control the display monitor 18 to indicate the image contents of each data file (a currently-generated data file or a data file read from the recording medium 17). The display monitor 18 is mounted on the body of the video camera 1. Preferably, the display monitor 18 is of a liquid crystal type. The signal processing block 14 can control the display monitor 18 to indicate thumbnail images.

The video camera 1 has a video input/output terminal 10A and an audio input/output terminal 10B. An external display device 21 is connected to the video input/output terminal 10A and the audio input/output terminal 10B. The signal processing block 14 can send the image contents of each data file to the external display device 21 through the video input/output terminal 10A while sending the sound contents of the data file to the external display device 21 through the audio input/output terminal 10B. In this case, the external display device 21 can reproduce the image/sound contents of the data file.

The video camera 1 has an interface 10C for connection with an external device. The interface 10C is of a wired connection type such as a USB type or an IEEE1394 type. The interface 10C may be of a wireless type such as an IEEE802.11g type or a wireless USB type. An external recording device 2 is connected to the interface 10C. Preferably, the external recording device 2 is a personal computer (PC). The signal processing block 14 can send each data file to the external recording device (the personal computer) 2 through the interface 10C.

Basically, a combination of the signal processing block 14 and the recording medium 17 in the video camera 1 is designed so that the recording medium 17 can be accessed by the personal computer 2. Preferably, the video camera 1 is designed to satisfy the specifications of the USB mass storage class. In the case where the video camera 1 and the personal computer 2 are connected via the USB interface 10C, the personal computer 2 recognizes the recording medium 17 in the video camera 1 as one drive device. Thus, in this case, the personal computer 2 is a host (an operating or controlling side) while the video camera 1 is a drive device (an operated or controlled side) connected thereto. Accordingly, the personal computer 2 can read each data file from the recording medium 17 in the video camera 1. In addition, the personal computer 2 can rewrite or update each data file in the recording medium 17. Furthermore, the personal computer 2 can delete each data file from the recording medium 17.

The SDRAM 19 is a memory or a recording device which can be accessed and controlled by the signal processing block 14. A combination of the signal processing block 14 and the SDRAM 19 is designed so that the SDRAM 19 can not be accessed by the personal computer 2.

The video camera 1 has an input unit 10D which can be operated by the user. The input unit 10D is connected to the signal processing block 14. User's instructions and authorizations can be inputted into the signal processing block 14 by operating the input device 10D.

The personal computer 2 includes a CPU 22, a data backup area 23, and a bus 24. The CPU 22 and the data backup area 23 are connected with the bus 24. The personal computer 2 has an interface 20C for connection with an external device. The interface 20C is of a wired connection type such as a USB type or an IEEE1394 type. The interface 20C may be of a wireless type such as an IEEE802.11g type or a wireless USB type. The interface 20C is connected with the bus 24. The interface 20C in the personal computer 2 and the interface 10C in the video camera 1 are coupled to each other.

The video camera 1 can be operated in a write-by-PC inhibiting mode. The video camera 1 has a switch 10E exclusively for the write-by-PC inhibiting mode. The switch 10E can be operated by the user. The signal processing block 14 starts the write-by-PC inhibiting mode of operation of the video camera 1 when the switch 10E is operated by the user. The signal processing block 14 cancels the write-by-PC inhibiting mode when the switch 10E is operated accordingly. The signal processing block 14 may control the display monitor 18 to indicate a setting menu which inquires of the user whether the write-by-PC inhibiting mode should be selected or not. The signal processing block 14 may start the write-by-PC inhibiting mode when the user operates the input unit 10D to select the write-by-PC inhibiting mode as a reply to the inquiry in the setting menu.

During the write-by-PC inhibiting mode of operation of the video camera 1, the signal processing block 14 sets a related flag in its ON state. The flag in its ON state prevents each data file in the recording medium 17 from being deleted, rewritten, and updated. Thus, the flag in its ON state protects each data file in the recording medium 17 against incidents and troubles such as the personal computer 2 being operated by the user in the wrong way, a shortage of the recording capacity in the personal computer 2, limitations on the number of sent data files and the size of a sent data file, a malfunction in the personal computer 2, a break in a connection signal line between the video camera 1 and the personal computer 2, and an interruption of power feed to the video camera 1 or the personal computer 2.

Preferably, a file system called "FAT (File Allocation Table)" is applied to the recording medium 17 in connection with writing and saving data files thereinto. In the FAT file system, there are clusters of sectors (unit recording areas) on the recording medium 17, and the sectors are managed on a cluster-by-cluster basis. One cluster is assigned one collection or one piece of captured image/sound data. One data file is formed by one or more collections (pieces) of captured image/sound data, and the number of the collections corresponds to the number of clusters used for the data file. The number of clusters for one data file, that is, the number of collections of captured image/sound data for one data file, depends on the length of a shooting time relating to the data file.

With reference to FIG. 2, a table "FAT" provided on the recording medium 17 lists serial ID numbers for respective clusters in the recording medium 17, and basically indicates an ID number for a cluster next to each of the clusters as viewed in a sequence of recorded contents. For a cluster storing a first collection of captured image/sound data, the table "FAT" indicates a set of an ID number for the cluster and an ID number for a cluster (the next cluster) storing a second collection of captured image/sound data which immediately follows the first collection as viewed in a sequence of captured images and sounds. Such a next cluster ID number can be an actual ID number for a next cluster or a sign "end". A cluster relating to a next cluster ID number of "end" stores the last collection among collections of captured image/sound data in one data file. In other words, a cluster relating to a next cluster ID number of "end" is the last cluster among clusters assigned to one data file. Besides the table "FAT", there is a table called a directory which is provided on the recording medium 17. As shown in FIG. 3, for each of data files, a directory stores information representing the name of the data file and information representing the ID number for the first cluster among clusters assigned to the data file.

The recording medium 17 has a data area. In the data area, one cluster is assigned to one collection (piece) of captured image/sound data. All collections (pieces) of captured image/sound data are recorded on the data area. An ID number for one cluster assigned to one collection of captured image/sound data is referred to as a first cluster information piece.

In the conditions of the table "FAT" and the directory of FIGS. 2 and 3, data files "A", "B", and "C" are recorded on the recording medium 17. The directory in FIG. 3 shows that an ID number for the first cluster among clusters assigned to the data file "A" is "0" and an ID number for the first cluster among clusters assigned to the data file "B" is "2", and an ID number for the first cluster among clusters (or a cluster) assigned to the data file "C" is "4". With reference to FIGS. 2-4, the data file "A" contains captured image/sound data pieces (collections) "a1" and "a2", and the data file "B" contains captured image/sound data pieces (collections) "b1", "b2", and "b3". The data file "C" contains a captured image/sound data piece (collection) "c". As shown in FIG. 4, in the data area, clusters having ID numbers of "0" and "1" store the data pieces "a1" and "a2" respectively. Clusters having ID numbers of "2", "3", and "6" store the data piece "b1", "b2", and "b3" respectively. A cluster having an ID number of "4" stores the data piece "c". Thus, the clusters having ID numbers of "0" and "1" are assigned to the data file "A". The clusters having ID numbers of "2", "3", and "6" are assigned to the data file "B". The cluster having an ID number of "4" is assigned to the data file "C".

When the data file "A" is requested to be read from the recording medium 17, the signal processing block 14 refers to the name of the requested data file "A" in the directory and thereby derives an ID number "0" for the first cluster among clusters assigned to the data file "A" from the directory. Then, the signal processing block 14 refers to the table "FAT" in response to the derived ID number "0", and thereby obtains a next cluster ID number of "1" from the table "FAT". Subsequently, the signal processing block 14 refers to the table "FAT" in response to the obtained ID number "1", and thereby detects from the table "FAT" that an ID number for a cluster next to the cluster having an ID number of "1" is "end". Finally, the signal processing block 14 accesses clusters having ID numbers equal to "0" and "1" and reads the data pieces "a1" and "a2" therefrom.

The personal computer 2 recognizes the recording medium 17 in the video camera 1 as one drive device. When the personal computer 2 is instructed to read a data file from the recording medium 17 in the video camera 1 for either playing back the contents of the data file or copying the data file, the CPU 22 in the personal computer 2 generates a playback-purpose read signal (a playback command) or a copying-purpose read signal (a copying command) according to an application program previously installed onto the personal computer 2. Then, the CPU 22 sends the generated read signal toward the video camera 1 via the bus 24 and the interface 20C while being controlled by the application program. The sent read signal enables the video camera 1 to decide whether the reading of the data file is for playing back the contents of the data file or copying the data file. Preferably, the read signal includes information representing the name of the data file (the requested data file).

The personal computer 2 may be instructed to read a plurality of data files from the recording medium 17 in the video camera 1. In this case, a corresponding read signal generated by the CPU 22 in the personal computer 2 represents the names of the data files.

Figure 5:
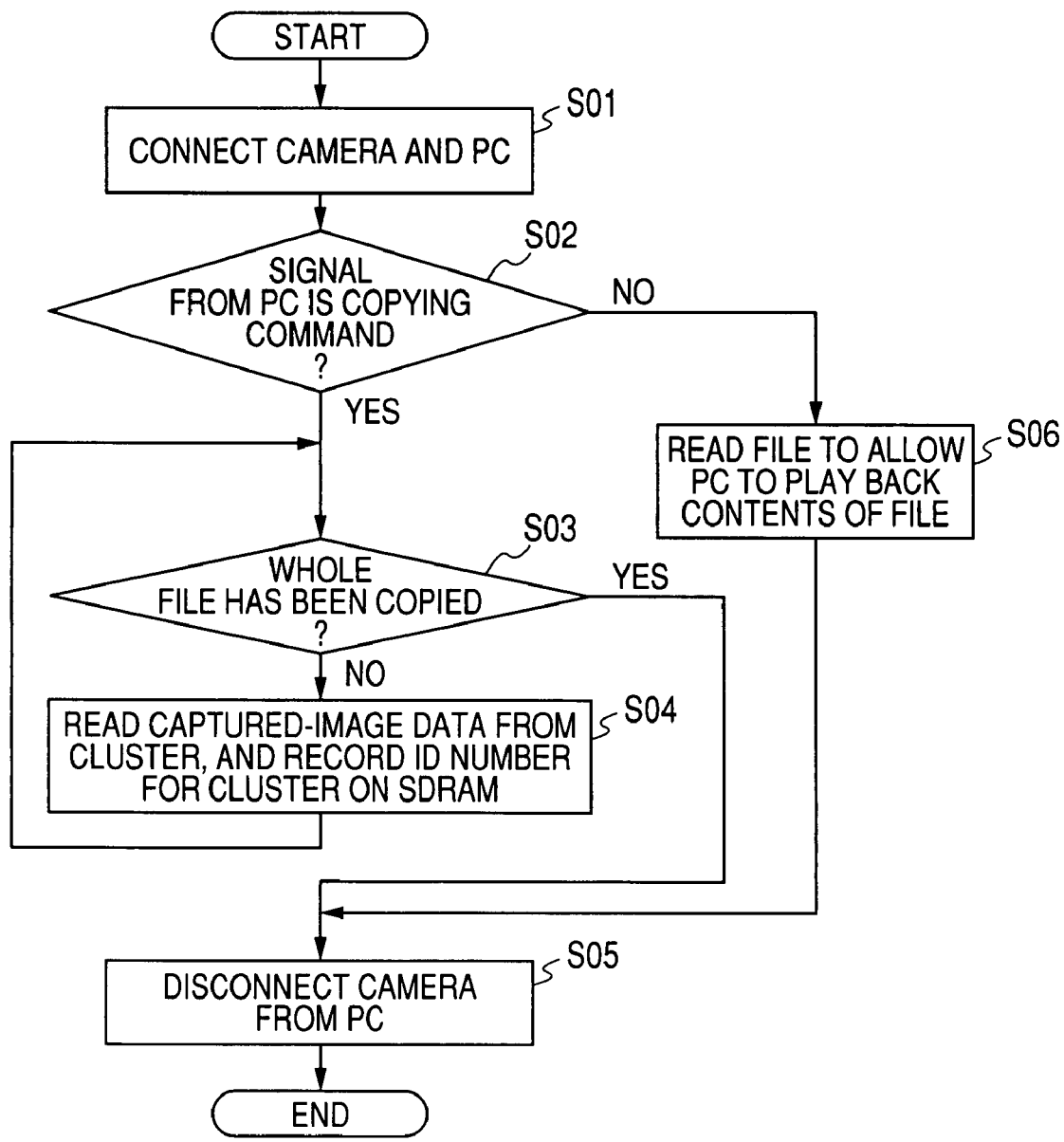
FIG. 5 is a flowchart of a first segment of a control program for a signal processing block within the video camera of FIG. 1.

The signal processing block 14 operates in accordance with the control program stored in the ROM 16. FIG. 5 is a flowchart of a first segment of the control program which relates to copying a data file from the recording medium 17 in the video camera 1 onto the personal computer 2.

As shown in FIG. 5, a first step S01 of the program segment establishes the USB connection of the video camera 1 with the personal computer 2.

A step S02 following the step S01 receives a read signal from the personal computer 2. The step S02 decides whether or not the received read signal is a copying command. When the received read signal is a copying command, the program advances from the step S02 to a step S03. When the received read signal is not a copying command, that is, when the received read signal is a playback command, the program advances from the step S02 to a step S06.

The step S06 derives the name of a requested data file from the received read signal. The step S06 reads the requested data file from the recording medium 17 in accordance with the derived name thereof. The step S06 sends the requested data file toward the personal computer 2. The personal computer 2 plays back the contents of the requested data file. After the reading of the requested data file from the recording medium 17 has been completed, the program advances from the step S06 to a step S05. In this case, an action of deleting the read data file from the recording medium 17 is prevented.

The step S03 derives the name of a requested data file from the received read signal. The step S03 decides whether or not the whole of the requested data file has been copied from the recording medium 17 onto the personal computer 2 by referring to, for example, information in the SDRAM 19 and the table "FAT" and the directory on the recording medium 17. When the whole of the requested data file has been copied, the program advances from the step S03 to the step S05. Otherwise, the program advances from the step S03 to a step S04.

For example, the step S03 refers to the table "FAT" and the directory on the recording medium 17 and thereby detects the ID numbers for all clusters assigned to the requested data file. Then, the step S03 decides whether or not all the detected cluster ID numbers are also in the SDRAM 19. When all the detected cluster ID numbers are also in the SDRAM 19, the step S03 concludes that the whole of the requested data file has been copied. Otherwise, the step S03 concludes that the whole of the requested data file has not been copied yet.

The step S04 reads one captured image/sound data piece (collection) in the requested data file from the recording medium 17. Specifically, the step S04 refers to the table "FAT" and the directory on the recording medium 17 and thereby detects the ID numbers for all clusters assigned to the requested data file. The step S04 accesses one of the clusters having the detected ID numbers, and reads one captured image/sound data piece (collection) therefrom. Then, the step S04 sends the read data piece toward the personal computer 2. The step S04 writes the ID number for the cluster loaded with the read data piece into the SDRAM 19 as a second cluster information piece. After the step S04, the program returns to the step S03. Thus, in given cases, the step S04 is iteratively executed.

The step S04 is designed to implement the following action. The step S04 sequentially reads all captured image/sound data pieces (collections) in the requested data file from the recording medium 17 while being iteratively executed. Therefore, all the data pieces in the requested data file are sequentially sent toward the personal computer 2. In addition, the ID numbers for the clusters loaded with all the data pieces in the requested data file are sequentially written into the SDRAM 19. These cluster ID numbers in the SDRAM 19 are the second cluster information pieces. As previously mentioned, the SDRAM 19 can not be accessed by the personal computer 2.

In summary, the step S04 detects a condition of the reading of the requested data file from the recording medium 17, and writes information representative of the detected condition into the SDRAM 19. The information written into the SDRAM 19 is the second cluster information pieces.

The step S05 breaks the USB connection of the video camera 1 with the personal computer 2. After the step S05, the current execution cycle of the program segment ends.

Since the step S06 is immediately followed by the step S05, it is possible to prevent the deletion of the data file from the recording medium 17 which is read and sent toward the personal computer 2 by the step S06 for the playback purpose.

In the case where the read signal received by the step S02 represents a plurality of requested data files, the sequence of the steps S03, S04, and S06 is executed for each of the requested data files.

The personal computer 2 can copy a requested data file from the recording medium 17 in the video camera 1 onto the data backup area 23 in the personal computer 2. Specifically, the personal computer 2 refers to the table "FAT" and the directory on the recording medium 17 to detect a cluster or clusters loaded with a captured image/sound data piece or pieces (collection or collections) in the requested data file. The detected cluster or clusters are in the data area (see FIG. 4) of the recording medium 17. The personal computer 2 reads the captured image/sound data piece or pieces from the detected cluster or clusters, and copies the read data piece or pieces onto the data backup area 23. Preferably, the data backup area 23 is formed by a semiconductor memory, a combination of a hard disc and a drive therefor, or a combination of a DVD and a drive therefor.

Figure 6:
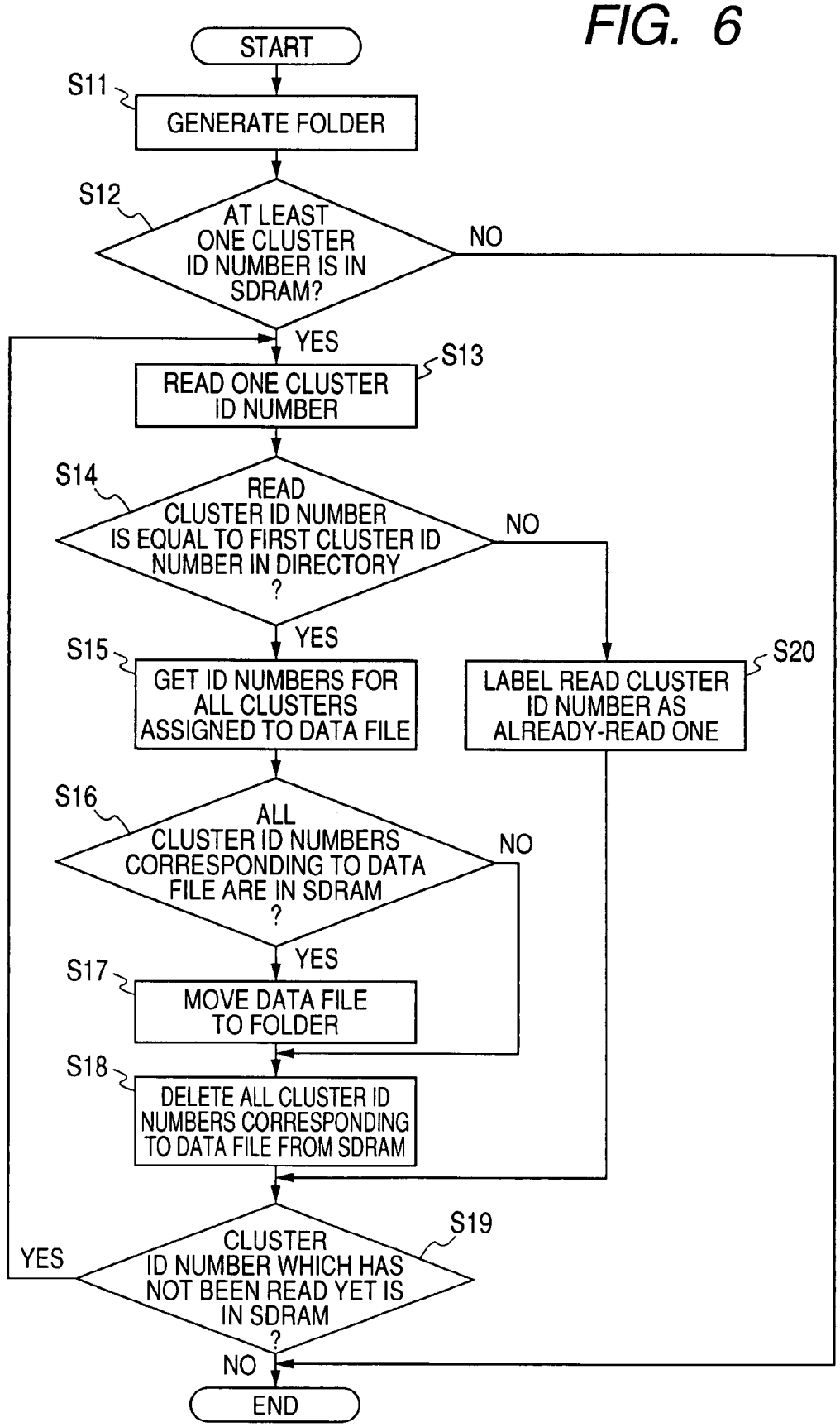
FIG. 6 is a flowchart of a second segment of the control program for the signal processing block within the video camera of FIG. 1.

FIG. 6 is a flowchart of a second segment of the control program for the signal processing block 14 which relates to detecting a data file copied from the video camera 1 onto the personal computer 2. The program segment in FIG. 6 follows the step S05 of the program segment in FIG. 5. Therefore, the program segment in FIG. 6 starts after the USB connection of the video camera 1 with the personal computer 2 is broken.

As shown in FIG. 6, a first step S11 of the program segment makes a new folder in the SDRAM 19. Preferably, the name of the new folder has a portion indicating the completion of deleting or copying a data file. This portion may indicate the word "deleted" or "copied". Preferably, the name of the new folder includes information representing the date and time of the copying of a data file. An example of this information is "PC20061102#1042".

A step S12 following the step S11 decides whether or not at least one cluster ID number (a second cluster information piece) is stored in the SDRAM 19. When at least one ID number for a cluster (a second cluster information piece) is stored in the SDRAM 19, the program advances from the step S12 to a step S13. Otherwise, the program exits from the step S12, and then the current execution cycle of the program segment ends.

The step S13 reads one cluster ID number from the SDRAM 19. After the step S13, the program advances to a step S14.

The step S14 refers to the directory (see FIG. 3) on the recording medium 17, and decides whether or not the read cluster ID number is equal to one of first cluster ID numbers in the directory. When the read cluster ID number is equal to one of first cluster ID numbers in the directory, the program advances from the step S14 to a step S15. Otherwise, the program advances from the step S14 to a step S20.

The step S20 labels the cluster ID number read by the step S13 as an already-read cluster ID number. After the step S20, the program advances to a step S19.

The step S15 refers to the table "FAT" (see FIG. 2) on the recording medium 17. The step S15 obtains, from the table "FAT", the ID numbers (the first cluster information pieces) for all clusters assigned to the data file related with the first cluster ID number equal to the read cluster ID number. It should be noted that for the data file related with only one cluster ID number, the step S15 obtains only one ID number for a cluster.

A step S16 following the step S15 decides whether or not all the cluster ID numbers (the first cluster information pieces) obtained by the step S15 are equal to those (the second cluster information pieces) in the SDRAM 19. When all the obtained cluster ID numbers are equal to those in the SDRAM 19, the program advances from the step S16 to a step S17. Otherwise, the program advances from the step S16 to a step S18.

The step S17 identifies the data file related with all the obtained cluster ID numbers. The step S17 moves the identified data file from the recording medium 17 to the new folder in the SDRAM 19. After the step S17, the program advances to the step S18.

In the case where at least one cluster ID number obtained by the step S15 is equal to none of the cluster ID numbers in the SDRAM 19, the whole of the data file related with the obtained cluster ID number has not been copied onto the data backup area 23 in the personal computer 2 yet. In this case, the program advances from the step S16 to the step S18 while skipping the step S17. Thus, in this case, the data file in question is prevented from being moved from the recording medium 17 to the new folder in the SDRAM 19.

On the other hand, in the case where all the cluster ID numbers obtained by the step S15 are equal to those in the SDRAM 19, the whole of the data file related with the obtained cluster ID numbers has been copied onto the data backup area 23 in the personal computer 2. In this case, the program advances from the step S16 to the step S17. Thus, in this case, the data file in question is moved from the recording medium 17 to the new folder in the SDRAM 19.

The step S18 deletes, from the SDRAM 19, all the cluster ID numbers (the second cluster information pieces) equal to those obtained by the step S15. After the step S18, the program advances to the step S19.

Accordingly, it is possible to discriminate between data files which have been copied and data files which have not been copied yet.

The step S19 decides whether or not there is at least one cluster ID number (a second cluster information piece) in the SDRAM 19 which has not been read by the step S13 yet. When there is at least one cluster ID number in the SDRAM 19 which has not been read by the step S13 yet, the program returns from the step S19 to the step S13. Otherwise, the program exits from the step S19, and then the current execution cycle of the program segment ends.

Thus, in given cases, the step S13 is iteratively executed. The step S13 is designed to implement the following action. The step S13 sequentially reads all cluster ID numbers from the SDRAM 19 while being iteratively executed.

In the above-mentioned way, data files which have been copied are identified and the file management is performed.

When cluster ID numbers in the SDRAM 19 are "0", "1", "2", and "3", the signal processing block 14 operates as follows. The signal processing block 14 reads a cluster ID number of "0" from the SDRAM 19 (the step S13 in FIG. 6). The signal processing block 14 refers to the directory on the recording medium 17, and decides that a cluster ID number of "0" is equal to a first cluster ID number in the directory (the step S14 in FIG. 6). The signal processing block 14 refers to the table "FAT" on the recording medium 17, and detects from the table "FAT" that the ID numbers for all clusters assigned to the data file related with a cluster ID number of "0" are "0" and "1" (the step S15 in FIG. 6). These cluster ID numbers "0" and "1" are in the SDRAM 19. Accordingly, it is shown that the whole of the data file "A" related with cluster ID numbers of "0" and "1" has already been copied from the recording medium 17 onto the data backup area 23 in the personal computer 2. Thus, the signal processing block 14 recognizes the data file "A" as one which has been copied. The signal processing block 14 moves the data file "A" from the recording medium 17 to the new folder in the SDRAM 19 (the step S17 in FIG. 6). Then, the signal processing block 14 deletes cluster ID numbers of "0" and "1" from the SDRAM 19.

Regarding cluster ID numbers of "2" and "3", the signal processing block 14 operates as follows. The signal processing block 14 reads a cluster ID number of "2" from the SDRAM 19 (the step S13 in FIG. 6). The signal processing block 14 refers to the directory on the recording medium 17, and decides that a cluster ID number of "2" is equal to a first cluster ID number in the directory (the step S14 in FIG. 6). The signal processing block 14 refers to the table "FAT" on the recording medium 17, and detects from the table "FAT" that the ID numbers for all clusters assigned to the data file related with a cluster ID number of "2" are "2", "3", and "6" (the step S15 in FIG. 6). The cluster ID numbers "2" and "3" are in the SDRAM 19 whereas the cluster ID number "6" is absent therefrom. Accordingly, it is shown that copying the data file "B" related with cluster ID numbers of "2", "3", and "6" has been interrupted at an intermediate point. Thus, it is shown that the whole of the data file "B" related with cluster ID numbers of "2", "3", and "6" has not been copied from the recording medium 17 onto the data backup area 23 in the personal computer 2 yet. Therefore, the signal processing block 14 recognizes the data file "B" as one which has not been copied yet. In this case, the movement of the data file "B" from the recording medium 17 to the new folder in the SDRAM 19 (the step S17 in FIG. 6) is prevented. Then, the signal processing block 14 deletes cluster ID numbers of "2" and "3" from the SDRAM 19.

The personal computer 2 may detect whether or not the whole of a requested data file has been copied from the recording medium 17 in the video camera 1 onto the data backup area 23 in the personal computer 2. Specifically, when the USB connection of the personal computer 2 with the video camera 1 is established, the personal computer 2 accesses the recording medium 17 in the video camera 1 and preliminarily reads the sizes of all data files in the recording medium 17. Thereafter, a requested data file is copied from the recording medium 17 onto the data backup area 23 in the personal computer 2. Subsequently, the personal computer 2 detects the size of the copied data file in the data backup area 23. The personal computer 2 compares the preliminarily-read size of the requested data file and the detected size of the copied data file. When the preliminarily-read size and the detected size are equal, the personal computer 2 concludes that copying the whole of the requested data file has been completed. Otherwise, the personal computer 2 concludes that copying the whole of the requested data file has not been completed yet. When it is concluded that copying the whole of the requested data file has been completed, the personal computer 2 generates a copying-completion signal about the requested data file. The personal computer 2 sends the generated copying-completion signal to the video camera 1. In response to the copying-completion signal, the video camera 1 labels the requested data file in the recording medium 17 as one which has been copied. Accordingly, the video camera 1 subjects the requested data file in the recording medium 17 to the processing for a data file which has been copied.

Figure 7:
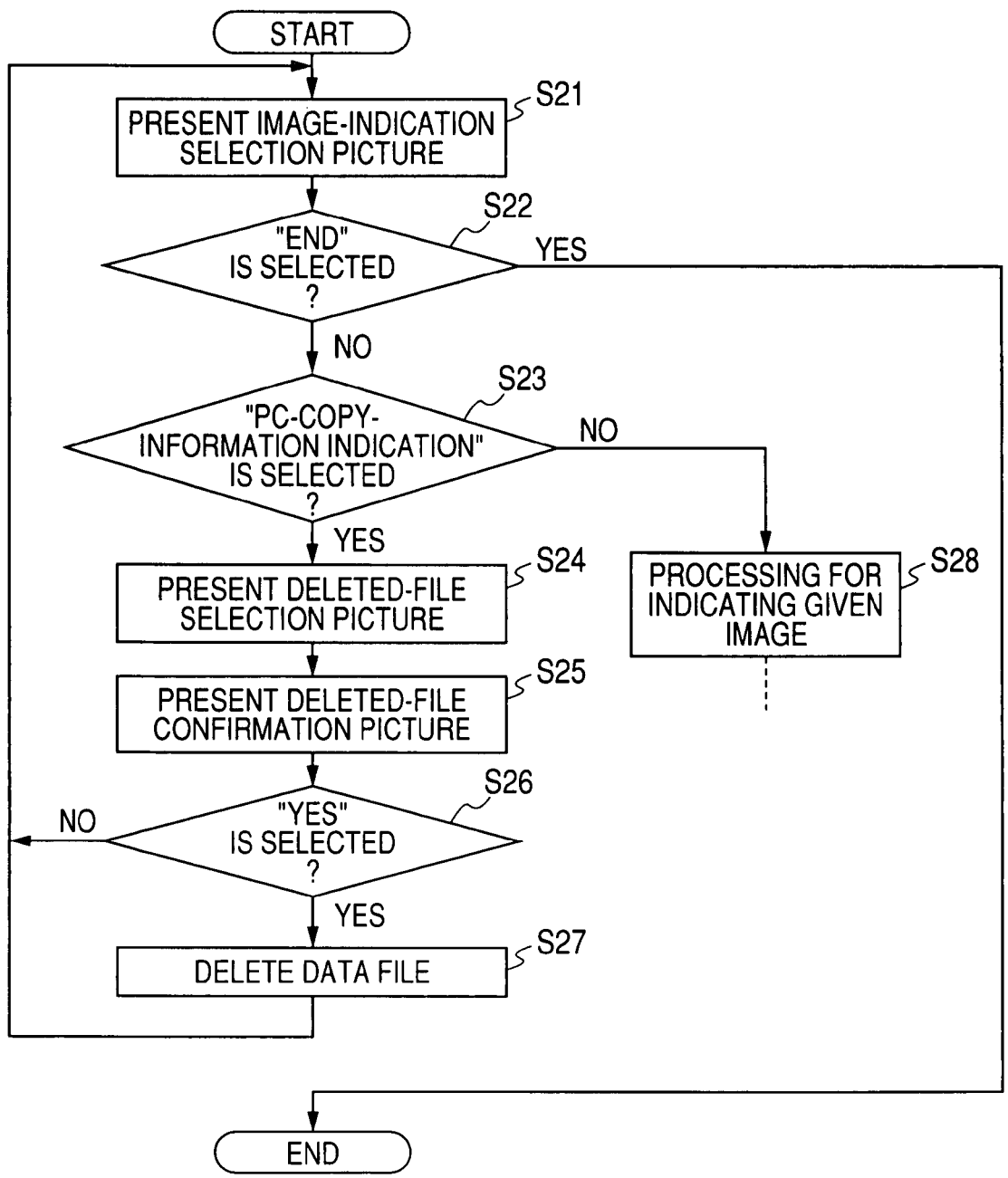
FIG. 7 is a flowchart of a third segment of the control program for the signal processing block within the video camera of FIG. 1.

FIG. 7 is a flowchart of a third segment of the control program for the signal processing block 14 which relates to deleting a data file or files from the recording medium 17.

Figure 8:
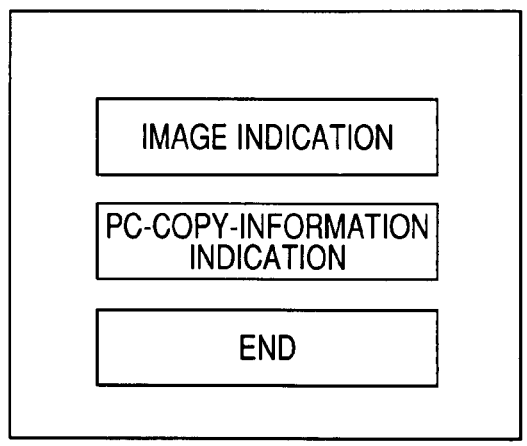
FIG. 8 is a diagram of an example of an image-indication selection picture presented by a display monitor of the video camera of FIG. 1.

As shown in FIG. 7, a first step S21 of the program segment controls the display monitor 18 to present an image-indication selection picture to the user. FIG. 8 shows an example of the image-indication selection picture in which rectangles of "image indication", "PC-copy-information indication", and "end" are arranged. The user can select one from "image indication", "PC-copy-information indication", and "end" by operating the input unit 10D.

A step S22 following the step S21 waits for the selection of one from "image indication", "PC-copy-information indication", and "end". After the selection, the step S22 decides whether or not "end" is selected. When "end" is selected, the program exits from the step S22 and then the current execution cycle of the program segment ends. Otherwise, the program advances from the step S22 to a step S23.

The step S23 decides whether or not "PC-copy-information indication" is selected. When "PC-copy-information indication" is selected, the program advances from the step S23 to a step S24. When "PC-copy-information indication" is not selected, that is, when "image indication" is selected, the program advances from the step S23 to a step S28. The step S28 and the subsequent steps (not shown) implement the indication of a prescribed image or images rather than the deletion of a data file or files.

Figure 9:
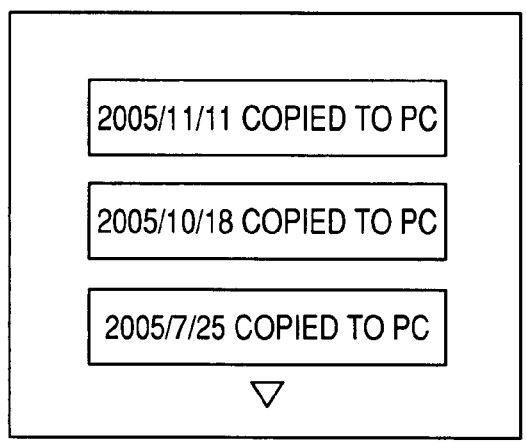
FIG. 9 is a diagram of an example of a deleted-file selection picture presented by the display monitor of the video camera of FIG. 1.

The step S24 controls the display monitor 18 to present a deleted-file selection picture to the user. FIG. 9 shows an example of the deleted-file selection picture which has an arrangement of rectangles of "2005/11/11 copied to PC", "2005/10/18 copied to PC", and "2005/7/25 copied to PC" for respective data files already copied onto the personal computer 2. The user can select one from the data files corresponding to "2005/11/11 copied to PC", "2005/10/18 copied to PC", and "2005/7/25 copied to PC" respectively by operating the input unit 10D.

Figure 10:
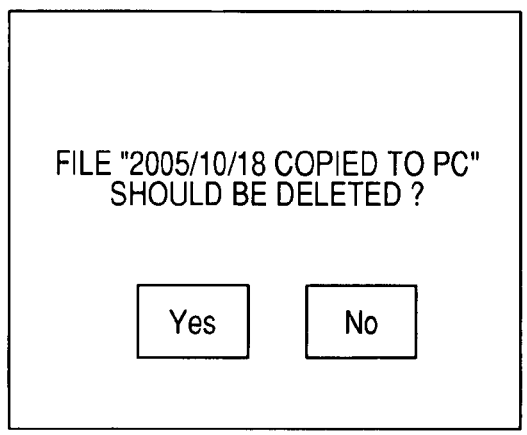
FIG. 10 is a diagram of an example of a deleted-file confirmation picture presented by the display monitor of the video camera of FIG. 1.

A step S25 waits for the selection of one from the data files. After the selection, the step S25 detects the selected data file. Subsequently, the step S25 controls the display monitor 18 to present a deleted-file confirmation picture to the user. FIG. 10 shows an example of the deleted-file confirmation picture which occurs in the case where the data file corresponding to "2005/10/18 copied to PC" is selected. The deleted-file confirmation picture in FIG. 10 has a portion indicating a question as to whether or not the selected data file (the data file corresponding to "2005/10/18 copied to PC") should be deleted. The deleted-file confirmation picture further has boxes of "yes" and "no". The user can select one from "yes" and "no" by operating the input unit 10D.

A step S26 following the step S25 waits for the selection of one from "yes" and "no". After the selection, the step S26 decides whether or not "yes" is selected. When "yes" is selected, the program advances from the step S26 to a step S27. Otherwise, the program returns from the step S26 to the step S21.

The step S27 deletes the selected data file from the new folder in the SDRAM 19. After the step S27, the program returns to the step S21.

When the step S26 decides that "no" is selected, the program returns directly to the step S21 and hence skips the step S27. Therefore, in this case, the selected data file is kept in the new folder in the SDRAM 19.

The user can select two or more from the data files corresponding to "2005/11/11 copied to PC", "2005/10/18 copied to PC", and "2005/7/25 copied to PC" respectively while referring to the deleted-file selection picture. In this case, when "yes" is selected for each of the selected data files, the step S27 deletes the selected data files.

Figure 11:
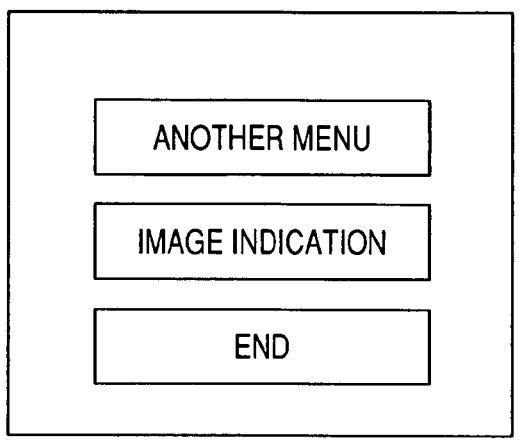
FIG. 11 is a diagram of an example of another image-indication selection picture presented by the display monitor of the video camera of FIG. 1.
Figure 12:
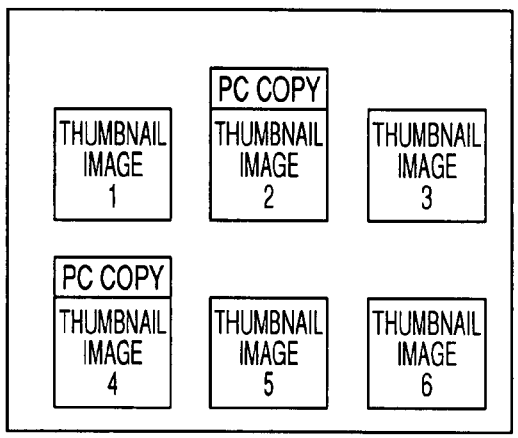
FIG. 12 is a diagram of an example of a thumbnail-image indication picture presented by the display monitor of the video camera of FIG. 1.

For deleting a data file or files which have been copied from the video camera 1 onto the personal computer 2, the signal processing block 14 may operate as follows. The signal processing block 14 controls the display monitor 18 to present an image-indication selection picture to the user. FIG. 11 shows an example of the image-indication selection picture in which rectangles of "another menu", "image indication", and "end" are arranged. The user can select one from "another menu", "image indication", and "end" by operating the input unit 10D. When "image indication" is selected, the signal processing block 14 generates signals representing thumbnail images corresponding to respective data files in the recording medium 17 and the SDRAM 19. The signal processing block 14 writes the thumbnail image signals into the SDRAM 19. The signal processing block 14 controls the display monitor 18 to present a thumbnail-image indication picture to the user which has the thumbnail images as shown in FIG. 12. It should be noted that during the recording of each captured image/sound data piece (collection) or each data file on the recording medium 17, the signal processing block 14 may generate a signal representing a thumbnail image corresponding to the data piece or the date file and record the thumbnail image signal on the recording medium 17. In this case, the signal processing block 14 retrieves thumbnail image signals from the recording medium 17 when "image indication" is selected.

In the thumbnail-image indication picture of FIG. 12, the thumbnail image corresponding to a data file which has been copied onto the personal computer 2 is accompanied with a mark of "PC copy" which denotes that the data file has been copied. On the other hand, the thumbnail image corresponding to a data file which has not been copied onto the personal computer 2 yet is without a mark of "PC copy". The thumbnail image corresponding to a data file which has been copied onto the personal computer 2 may be provided or accompanied with the date of the related copying. Accordingly, it is possible to discriminate between data files which have been copied and data files which have not been copied yet.

Figure 13:
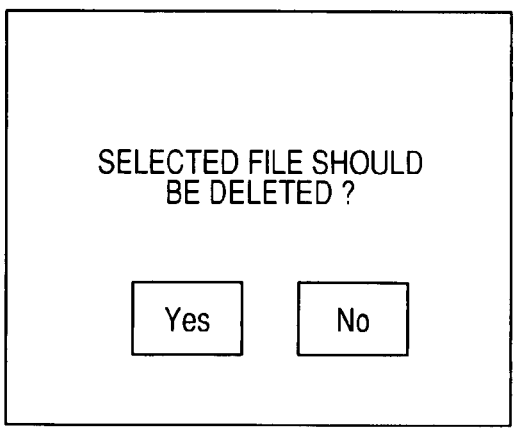
FIG. 13 is a diagram of an example of another deleted-file confirmation picture presented by the display monitor of the video camera of FIG. 1.

The user can select one from the thumbnail images in the thumbnail-image indication picture of FIG. 12 by operating the input unit 10D. When one is selected from the thumbnail images, the signal processing block 14 controls the display monitor 18 to present a deleted-file confirmation picture to the user. The signal processing block 14 concludes from the selected thumbnail image that a data file corresponding to the selected thumbnail image is selected from the data files. FIG. 13 shows an example of the deleted-file confirmation picture which has a portion indicating a question as to whether or not the selected data file should be deleted. The deleted-file confirmation picture further has boxes of "yes" and "no". The user can select one from "yes" and "no" by operating the input unit 10D. The signal processing block 14 decides which of "yes" and "no" is selected. When "yes" is selected, the signal processing block 14 deletes the selected data file from the recording medium 17 or the SDRAM 19. When "no" is selected, the signal processing block 14 keeps the selected data file in the recording medium 17 or the SDRAM 19.

It should be noted that the deletion of a selected data file from the recording medium 17 or the SDRAM 19 may be implemented by canceling the write-by-PC inhibiting mode with respect to the video camera 1 and then allowing the personal computer 2 to access the video camera 1.

The video camera 1 may be modified in various ways. According to a first modification of the video camera 1, the discrimination between data files which have been copied and data files which have not been copied yet is implemented by generating a list (a list file) and loading the list with only the names of the data files which have been copied. For example, the step S11 in FIG. 6 generates a copying-completion-file list in the SDRAM 19. The step S17 in FIG. 6 records the name of a data file, which has been copied, in the copying-completion-file list.

Various information pieces may be added to a data file which has been copied. The added information pieces include, for example, an information piece representing the name of the data file, an information piece representing the date and time of the related copying, an information piece representing the name and model of the personal computer 2, and an information piece representing the name of the user.

Both the new folder and the copying-completion-file list may be generated. The new folder and the copying-completion-file list may be provided in the recording medium 17 rather than the SDRAM 19.

Copying-related flags may be generated for data files, respectively. For each data file which has been copied, the corresponding copying-related flag is set to its ON state. For each data file which has not been copied yet, the corresponding copying-related flag is set to its OFF state. Accordingly, by referring to the states of the copying-related flags, it is possible to discriminate between data files which have been copied and data files which have not been copied yet. Data files which have been copied may be deleted in response to the corresponding copying-related flags. In this case, it is unnecessary to generate the new folder and the copying-completion-file list.

As understood from the previous description, the video camera 1 detects data files which have been copied, and notifies the user of the detected data files. Then, for each of the detected data files, the user gives the video camera 1 a command to delete the data file or a command to keep the data file. It should be noted that the video camera 1 may automatically delete the detected data files (the data files which have been copied) without user's authorization.

Preferably, the data transfer between the video camera 1 and the personal computer 2 is accorded with the USB connection and the USB mass storage class. The data transfer may be of another type. For example, the video camera 1 and the personal computer 2 are connected via a wireless LAN, and a communication protocol called PTP/IP (Picture Transfer Protocol over Internet Protocol) is applied to the data transfer therebetween.

What is claimed is:

1. A camera comprising:
   first means for repetitively capturing an image of a subject and generating captured-image data representing the captured image of the subject;
   a first recording medium;
   second means for recording the captured-image data generated by the first means on one or more of clusters of unit recording areas in the first recording medium, wherein first cluster information pieces are assigned to the clusters respectively;
   third means for managing said one or more of the clusters as one data file including the captured-image data recorded on said one or more of the clusters by the second means;
   fourth means for receiving a control signal from an external recording device;
   fifth means for deciding whether or not the control signal received by the fourth means is a copying command indicative of a requested data file;
   sixth means for reading captured-image data in the requested data file from one or more clusters in the first recording medium and sending the read captured-image data toward the external recording device when the fifth means decides that the control signal is the copying command;
   a second recording medium;
   seventh means for detecting a first cluster information piece or pieces assigned to said one or more clusters from which the sixth means reads the captured-image data;
   eighth means for recording the first cluster information piece or pieces detected by the seventh means on the second recording medium as a second cluster information piece or pieces;
   ninth means for detecting a first cluster information piece or pieces assigned to one or more clusters loaded with captured-image data in the requested data file;
   tenth means for deciding whether or not the first cluster information piece or pieces detected by the ninth means are the same as the second cluster information piece or pieces;
   eleventh means for recognizing the requested data file as a data file which has been copied only when the tenth means decides that the first cluster information piece or pieces detected by the ninth means are the same as the second cluster information piece or pieces; and
   twelfth means for discriminating a data file which has been copied and a data file which has not been copied yet from each other in response to the recognizing by the eleventh means.

2. A camera as recited in claim 1, wherein the twelfth means comprises means for generating a folder in the second recording medium, and means for moving a data file, recognized by the eleventh means as a data file which has been copied, from the first recording medium to the generated folder.

3. A camera as recited in claim 1, wherein the twelfth means comprises means for generating a list file in the second recording medium, and means for recording information about a data file, recognized by the eleventh means as a data file which has been copied, into the generated list file.

4. A camera as recited in claim 1, wherein the twelfth means comprises a display, means for generating signals representing thumbnail images corresponding to respective data files, and means for indicating the thumbnails represented by the said generated signals on the display in a manner such that a data file which has been copied and a data file which has not been copied yet can be discriminated from each other.

5. A camera as recited in claim 1, wherein the first recording medium and the second recording medium comprise a common recording medium including a hard disc.

6. A camera as recited in claim 1, wherein the first recording medium and the second recording medium are different from each other.

7. A camera as recited in claim 6, wherein the first recording medium includes a hard disc.

8. A file management method used for a camera, comprising the steps of:
   repetitively capturing an image of a subject and generating a captured-image data representing the captured image of the subject;
   recording the captured-image data generated by the capturing step on one or more of clusters of unit recording areas in a first recording medium, wherein first cluster information pieces are assigned to the clusters respectively;
   managing said one or more of the clusters as one data file including the captured-image data recorded on said one or more of the clusters by the recording step;
   receiving a control signal from an external recording device;
   deciding whether or not the control signal received by the receiving step is a copying command indicative of a requested data file;
   reading captured-image data in the requested data file from one or more clusters in the first recording medium and sending the read captured-image data toward the external recording device when the deciding step decides that the control signal is the copying command;

detecting a first cluster information piece or pieces assigned to said one or more clusters from which the reading step reads the captured-image data;

recording the first cluster information piece or pieces detected by the detecting step on a second recording medium as a second cluster information piece or pieces;

identifying a first cluster information piece or pieces assigned to one or more clusters loaded with captured-image data in the requested data file;

determining whether or not the first cluster information piece or pieces identified by the identifying step are the same as the second cluster information piece or pieces;

recognizing the requested data file as a data file which has been copied only when the determining step determines that the first cluster information piece or pieces identified by the identifying step are the same as the second cluster information piece or pieces; and discriminating a data file which has been copied and a data file which has not been copied yet from each other in response to the recognizing by the recognizing step.

9. A file management method as recited in claim 8, wherein the discriminating step comprises generating a folder in the second recording medium, and moving a data file, recognized by the recognizing step as a data file which has been copied, from the first recording medium to the generated folder.

10. A file management method as recited in claim 8, wherein the discriminating step comprises generating a list file in the second recording medium, and recording information about a data file, recognized by the recognizing step as a data file which has been copied, into the generated list file.

11. A file management method as recited in claim 8, wherein the discriminating step comprises generating signals representative of thumbnail images corresponding to respective data files, and displaying the thumbnails represented by the said generated signals in a manner such that a data file which has been copied and a data file which has not been copied yet can be discriminated from each other.

12. A file management method as recited in claim 8, wherein the first recording medium and the second recording medium comprise a common recording medium.

13. A file management method as recited in claim 8, wherein the first recording medium and the second recording medium are different from each other.

* * * * *